D. P. LEWIS.
Rotary Cultivator.
No. 61,438.
Patented Jan. 22, 1867.
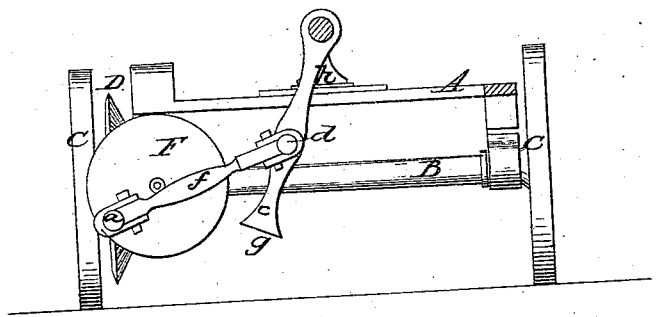
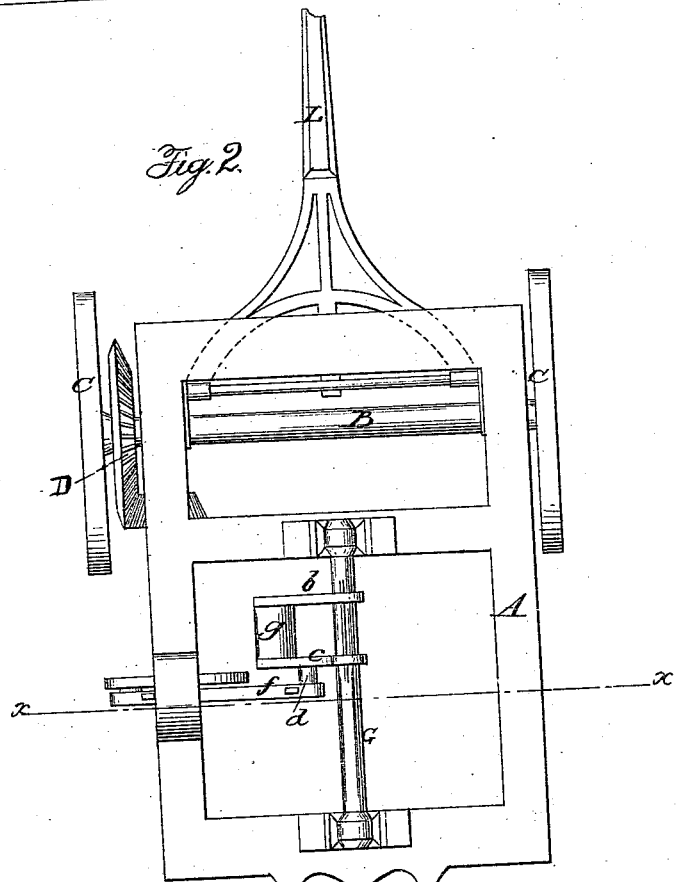

United States Patent Office.

DAVID P. LEWIS, OF HUNTSVILLE, ALABAMA.

Letters Patent No. 61,438, dated January 22, 1867.

---

IMPROVEMENT IN COTTON CHOPPER AND THINNER.

---

The Schedule referred to in these Letters Patent and making part of the same.

---

TO ALL WHOM IT MAY CONCERN:

Be it known that I, DAVID P. LEWIS, of Huntsville, in the county of Madison, and State of Alabama, have invented a new and useful Improvement in Cotton Chopper and Thinner; and I do hereby declare that the following is a full, clear, and exact description thereof, which will enable others skilled in the art to make and use the same, reference being had to the accompanying drawings, forming part of this specification.

My invention relates more particularly to the cultivation of cotton, but is adapted to other crops; and it consists in operating a double-bladed hoe by machinery, and in such a manner that the depth which the hoe shall cut may be governed by the attendant, as will be hereinafter described.

Figure 1 represents a vertical section of my machine, through the line $x\ x$ of fig. 2.

Figure 2 a plan or top view.

Similar letters of reference indicate like parts.

My machinery is mounted on wheels, and the axle supports all the fixtures and operates the machinery by the revolution of the wheels. The main portion of the apparatus is attached to a rectangular-shaped frame, which is supported by the axle near one end on stands, through which the axle revolves. At the other end of the frame there are handles, by which the machine is guided. A represents the frame; B the axle, which revolves with the wheels; C the wheels, attached to the axle; D is a bevel gear-wheel, also attached to the axle, and which revolves with it. This is the driving-gear of the operating parts of the machine. E is a bevel-pinion, which works in and is driven by the wheel D. This pinion is attached to the end of a shaft, which revolves under the frame A. This shaft is supported by hangers, which are attached to the under side of the frame. Upon the other end of this shaft there is a crank-wheel, F. This wheel is a plain disk, with a crank-pin, $a$, attached. Above the frame A, supported on stands which are attached to the frame, there is another shaft, G. The stands are seen in fig. 1, at $h$. Attached to this shaft, and hanging below it, are two bars, $b$ and $c$, connected together at their bottom ends by a two-edged plate, $g$, which forms the hoe. Attached to one of these upright bars $c$, there is a wrist-pin, $d$. $f$ is a connecting-rod, attached to the bar $c$ at one end, and to the crank-wheel F at the other end. It will be seen that when the machine is in operation, the two bars $b$ and $c$, with the hoe $g$, have a swinging transverse motion across the path traversed by the machine, and that the shaft G is a rock-shaft. It is this swinging or oscillating motion of the hoe $g$ that performs the desired work in the cotton field. The wrist-pin $d$ may be attached to the bar $c$, in a slot, so that the stroke of the hoe may be increased or diminished, as may be desired. The throw of the crank may also be varied, by moving the crank-pin to different holes in the crank-wheel F. The depth of the cut of the hoe is governed by the attendant, who has hold of the handles $j\ k$, and can lift the hoe from the ground when desired. L is the tongue, to which the power is applied which drives the machine. It is attached to the axle by hanging eyes, through which the axle revolves.

Having thus described my invention, what I claim as new, and desire to secure by Letters Patent, is—

A machine for cutting and thinning cotton, and for other purposes, constructed, arranged, and combined substantially as herein shown and described.

DAVID P. LEWIS.

Witnesses:
JULIEN FRAZIER,
R. C. BRICKELL.